May 27, 1952  E. A. PRIEUR  2,598,012
ARTIFICIAL FISH LURE
Filed Dec. 5, 1949                            2 SHEETS—SHEET 1

Inventor
Ernest A. Prieur

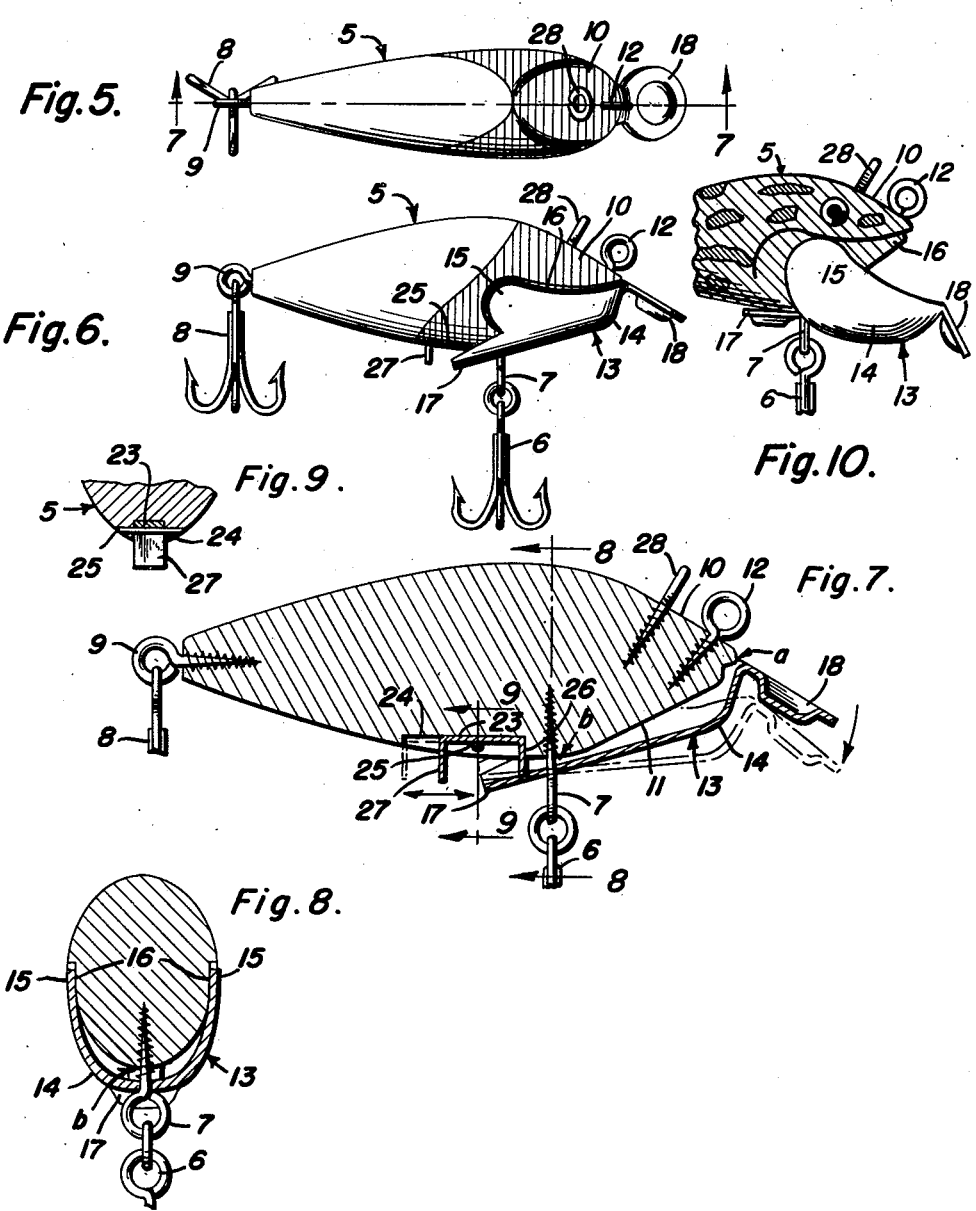

Patented May 27, 1952

2,598,012

UNITED STATES PATENT OFFICE 2,598,012

ARTIFICIAL FISH LURE

Ernest A. Prieur, Flint, Mich.

Application December 5, 1949, Serial No. 131,112

12 Claims. (Cl. 43—42.47)

This invention relates to artificial fish lures of the type adapted for use in casting and trolling, and including a body of wood or other suitable material having a shape somewhat along the lines of a small fish and carrying hooks.

The primary object of the present invention is to provide a lure of the above-mentioned type which is attractive and highly realistic in appearance and strangely life-like in action, and which will very closely imitate actions and erratic swimming movements of a small fish, when said lure is drawn through the water.

Another object of the invention is to provide a lure of the above kind which includes a body, and a lower jaw simulating member pivoted to said body and provided with end fin and deflector extensions, the forward end of the body having forwardly converging inclined top and bottom surfaces coacting with said lower jaw simulating member and its extensions so as to cause the lure to have the desired actions and movements.

A further object is to provide manually operable means to selectively secure the lower jaw simulating member in closed position, or to adjustably limit the opening movements thereof, whereby the actions of the lure may be varied at will.

Still another object is to provide a lure of the above kind having a freely pivoted lower jaw simulating member which will open and close when the lure is in use to simulate the actions of a fish when feeding.

A still further object is to provide a lure of the above kind having a freely pivoted member which simulates the lower jaw and gills of a fish, and which will open and close when the lure is in use to somewhat simulate the respiration and feeding actions of a fish.

Additional objects and features of the present invention will appear from the following description when considered with the accompanying drawings, in which:

Figure 5 is a view similar to Figure 1, showing a modified form of the invention;

Figure 6 is a side elevational view of the lure shown in Figure 5;

Figure 7 is an enlarged section taken on the line 7—7 of Figure 5;

Figure 8 is a transverse section taken on the line 8—8 of Figure 7;

Figure 9 is a fragmentary vertical transverse section taken on the line 9—9 of Figure 7; and Figure 10 is a fragmentary side elevational view of the construction seen in Figure 2 but showing the jaw simulating member in open position.

Figure 3:
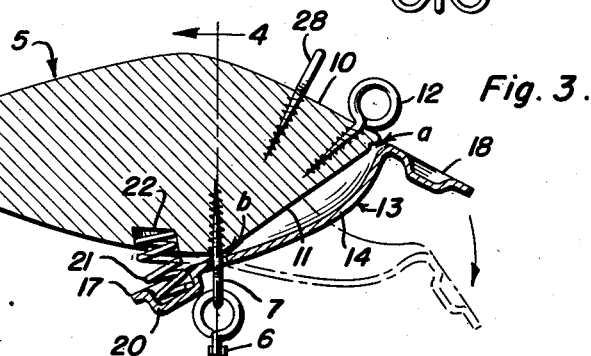
Figure 3 is an enlarged vertical longitudinal section taken on the line 3—3 of Figure 1.
Figure 4:
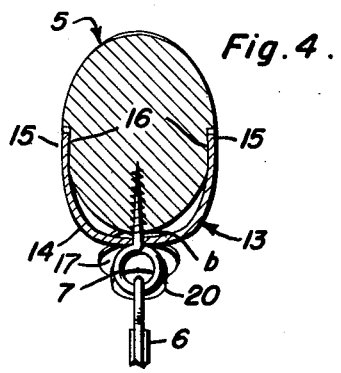
Figure 4 is a transverse vertical section taken on the line 4—4 of Figure 3.

Referring in detail to Figures 1 to 10 inclusive of the drawings, 5 indicates a buoyant body made of wood or other suitable material and shaped to substantially simulate a minnow or other small fish minus Figures 3 and 7 the lower jaw and gills, as well as preferably having its surface suitably finished in attractive colors according to common practice. A gang hook 6 is attached to the bottom and substantially at the center of the body by an eye screw 7, and a second gang hook 8 is attached to the rear end of said body by an eye screw 9. The body 5 has forwardly converging upper front and lower front plane surfaces 10 and 11, respectively, and at least one line attaching eye 12 is provided near the lower front end of the surface 10.

Freely pivoted to and embracing the lower portion of the front end of the body 5 is a rearwardly inclined concaved member 13 which is preferably made of sheet metal and shaped to simulate the lower jaw and gills of a fish, the same consisting of a jaw portion 14 and gill portions 15 that are respectively spaced from the surface 11 and seated against the sides of the body. The body 5 is recessed as at 16 to receive the side edges of the jaw portion 14 and the gill portions 15, and to limit the closing movement of the former. It will be seen that the respective front and rear ends of the jaw portion 14 are slightly spaced from the body 5, as at a and b, when said portion is closed, whereby water may flow rearwardly through the space between the rearwardly inclined surface 11 and the member 13 when the lure is drawn through the water so as to tend to nose the latter upwardly. The member 13 has a rearwardly inclined fin extension 17 on its rear end, and is provided with a cupped forwardly inclined deflector extension 18 on its front end which is acted upon by the water so as to tend to open or swing the member 13 downwardly, and so as to coact with the surface 10 to tend to cause the lure to nose downwardly. The position of member 13 and its extension 18 and the speed of travel of the lure govern to a great extent the action of the lure, and especially whether it surfaces or dives.

In the embodiments of Figures 1-4 and 5-9, the member 13 is pivotally or tiltably mounted on the body by the eye screw 7, while in that of Figures 10–13, pivot screws 19 are passed through the gill portions 15 and threaded into the body 5.

In the form of Figures 1–4, the fin extension 17 is cupped as at 20 to form a seat for the lower end of a helical compression spring 21, whose upper end is seated in a socket 22 provided in the bottom of body 5, and which acts to yieldingly close the member 13.

Figure 1:
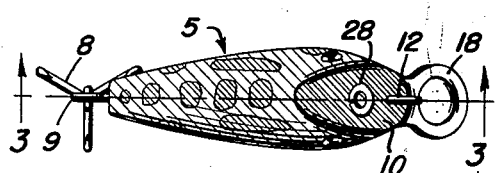
Figure 1 is a top plan view of a lure embodying the present invention.
Figure 2:
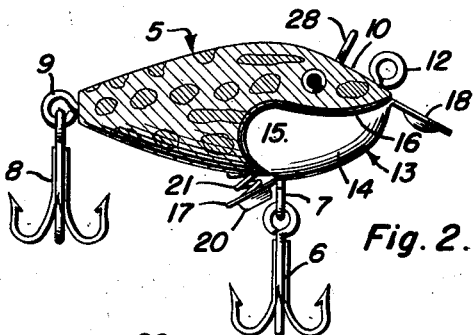
Figure 2 is a side elevational view thereof.

In the embodiment of Figures 5 and 6, the member 13 gravitates to open position. However, in the form of Figures 7–9, manually operable means is provided to selectively hold the member 13 closed or adjustably limit opening thereof. This means consists of a slidable stop member 23 frictionally held in a longitudinal elongated recess 24 by means of a cross pin 25, said stop member having a depending forward end 26 overlying the fin extension 17 and a depending rear end 27 forming a finger piece. By sliding the stop member 23 forwardly, its forward end 26 will be caused to coact with the fin extension 17 for the purpose stated, as will be apparent. In the embodiments of Figures 1 and 5, a second line attaching eye 28 is provided behind the eye 12 for use when it is desired to augment the diving tendency of the lure.

Generically reviewed, the invention has to do with a buoyant body which is of suitable shape and size to represent a small fish. The forward end or head portion is bare and is consequently minus the usual lower jaw and ever-active gills. The crest of the head slants forwardly and downwardly and the underneath side of said head slants forwardly and upwardly, thus providing a V-shaped profile characterized by the aforementioned forwardly converging upper front and lower front plane surfaces. The imitation jaw and gill means is in the form of the stated lower jaw member, and this is an elongated concavo-convex plate somewhat resembling a scoop. The web or mid portion is coextensive with and is spaced from the lower front surfaces 11, providing the desired passageway for water. By hinging the rear end portion of the concavo-convex member 13 to the ventral portion of the body and arranging the pivot as shown, the pivot not only allows the jaw member to open and close but places the fulcruming point on a plane below the lowest surface of the body. The cupped baffle or so-called deflector extension and convex under side of the member 13 coordinate in insuring effective opening and closing and promote requisite jaw activity.

From the foregoing description, the nature and advantages of the invention will be apparent to those skilled in the art. Further modifications and structural changes may be made within the spirit of the invention as claimed.

Having described the invention, what is claimed as new is:

1. An artificial fish lure comprising a buoyant body shaped to represent and simulate a small fish, said body having a bare frontal portion minus the usual lower jaw portion and gill portions and having inclined forwardly converging upper front and lower front plane surfaces, an elongated concavo-convex member shaped to simulate and provide the lower jaw portion and gill portions of the fish, said member including a longitudinally extending mid-portion, between the side portions thereof, underlying and being at all times spaced from the coacting front plane surface, and hinge means attaching the rear end of said mid-portion to the coacting portion of said body, the fulcruming point of said mid-portion being on a plane below the lowermost plane of the ventral portion of said body.

2. The construction defined in claim 1, wherein diametrically opposite side portions of said body are recessed to provide stop shoulders to conformably accommodate and receive the corresponding side portions of the jaw portion and gill portions of said member when the latter is closed, whereby the edges of said side portions and shoulders contact one another.

3. The construction defined in claim 1, wherein said member is provided at its rear end with a rearwardly inclined fin extension diverging from said ventral portion and is further provided at its front end with a forwardly and downwardly inclined deflector extension.

4. The construction defined in claim 1, wherein said member is provided at its rear end with a rearwardly inclined fin extension and at its front end with a forwardly inclined deflector extension, said deflector extension being indented and thus cupped.

5. The construction defined in claim 1 and manually operable means carried by the ventral portion of the body for selectively holding said member closed and/or adjustably limiting the opening movements thereof relative to said front plane surface.

6. The structure specified in claim 1, wherein said hinge means comprises a screw and slot connection between the member and body, permitting said member to flap freely in opening and closing and otherwise responding to the action of the member and body to the water, depending on whether the body is on the surface or below the surface of the water.

7. The construction defined in claim 1, wherein said member is provided at its rear end with a rearwardly inclined fin extension and at its front end with a forwardly inclined deflector extension, and a slidable stop member carried by the body and arranged to coact with said fin extension to selectively hold said member closed and to adjustably limit opening thereof, relative to said body.

8. The construction defined in claim 1, wherein said member is provided at its rear end with a rearwardly inclined fin extension and at its front end with a forwardly inclined deflector extension, said fin extension being cupped to provide a spring seat, said body having a bottom socket lined up with said seat, and a helical compression spring interposed between said fin extension and said body and having its ends engaged in said spring seat and said socket respectively to normally close said member.

9. The construction defined in claim 1 wherein said member is provided at its rear end with a rearwardly inclined fin extension and at its front end with a forwardly inclined deflector extension, and a spring interposed between the body and the fin extension for normally closing said concaved member.

10. An artificial fish lure of the class described comprising a buoyant body shaped substantially to represent the body of a small fish minus the usual lower jaw and gills and having inclined forwardly converging upper front and lower front surfaces, said surfaces being substantially flat, a longitudinally elongated concavo-convex member including a longitudinally dished mid-portion and longitudinal side portions coextensive with said mid-portion and coacting respectively in defining a lower jaw and fish gills, the rear end of said mid-portion being provided with a slot, and a hook suspending eye-screw having its shank portion passing through the slot and screwed into the bottom of said body and pivotally connecting the member on said body, said rear end functioning to check the downwardly swinging movement of said member relative to said front plane surface.

11. The structure defined in claim 10, wherein the rear end of said member, rearwardly of said eye-screw, embodies an extension formed with a cup providing a spring seat, and a coil spring having one end engaged in said seat and the other end engaged with a coacting surface of said body.

12. The structure defined in claim 10, wherein the rear end of said member, rearwardly of said eye-screw provides an adjusting extension, and a manually regulable inverted U-shaped slide slidably mounted on said body and having one end portion adjustably engageable with said extension.

ERNEST A. PRIEUR.

REFERENCES CITED

The following references are of record in the file of this patent:

UNITED STATES PATENTS

| Number | Name | Date |
| --- | --- | --- |
| 1,114,137 | Heddon | Oct. 20, 1914 |
| 1,239,956 | Phinney | Sept. 11, 1917 |
| 1,345,600 | Keeling | July 6, 1920 |
| 1,927,441 | Korte | Sept. 19, 1933 |
| 2,112,901 | Anderson | Apr. 5, 1938 |
| 2,277,453 | Phillips | Mar. 24, 1942 |
| 2,494,384 | Gadzinski et al. | Jan. 10, 1950 |
| 2,495,134 | Roberts | Jan. 17, 1950 |